(12) United States Patent
Liu

(10) Patent No.: US 7,406,294 B1
(45) Date of Patent: Jul. 29, 2008

(54) DIGITAL AUDIO FILE REPRODUCTION SYSTEM AND METHOD WITH WIRELESS TRANSFER CAPABILITY

(76) Inventor: Frank Kung Fu Liu, 23130 Ridge Line, Diamond Bar, CA (US) 91765

( * ) Notice: Subject to any disclaimer, the term of this patent is extended or adjusted under 35 U.S.C. 154(b) by 629 days.

(21) Appl. No.: 10/721,125

(22) Filed: Nov. 25, 2003

(51) Int. Cl.
*H04H 40/00* (2008.01)

(52) U.S. Cl. .................... 455/3.06; 455/558; 455/41.2; 455/569.1; 455/575.9

(58) Field of Classification Search ............... 455/3.06, 455/558, 41.2, 569.1, 569.2, 575.9, 152.1
See application file for complete search history.

(56) References Cited

U.S. PATENT DOCUMENTS

| | | | |
|---|---|---|---|
| 5,732,324 A | 3/1998 | Rieger, III | |
| 6,212,555 B1 | 4/2001 | Brooks, Jr. et al. | |
| 6,285,757 B1 | 9/2001 | Carroll et al. | |
| 6,408,232 B1 | 6/2002 | Cannon et al. | |
| 6,493,546 B2 | 12/2002 | Patsiokas | |
| 6,678,516 B2 * | 1/2004 | Nordman et al. | 455/414.1 |
| 6,724,872 B1 * | 4/2004 | Moore et al. | 379/93.35 |
| 7,116,939 B1 * | 10/2006 | Kandler et al. | 455/41.3 |
| 7,127,261 B2 * | 10/2006 | Van Erlach | 455/456.5 |
| 7,248,572 B2 * | 7/2007 | Bender et al. | 370/338 |
| 2001/0049262 A1 * | 12/2001 | Lehtonen | 455/41 |
| 2002/0132616 A1 * | 9/2002 | Ross et al. | 455/419 |
| 2002/0147648 A1 * | 10/2002 | Fadden et al. | 705/16 |
| 2003/0033413 A1 | 2/2003 | Wilson, Jr. et al. | |
| 2003/0114133 A1 | 6/2003 | Enners | |
| 2004/0066776 A1 * | 4/2004 | Ishidoshiro | 370/352 |
| 2004/0235521 A1 * | 11/2004 | Pradhan et al. | 455/558 |
| 2005/0107120 A1 * | 5/2005 | Yueh | 455/557 |

* cited by examiner

*Primary Examiner*—Matthew Anderson
*Assistant Examiner*—Minh Dao
(74) *Attorney, Agent, or Firm*—Dan Brown Law Office; Daniel R. Brown

(57) ABSTRACT

A digital audio file reproduction apparatus, system and method having wireless transfer capability with a remote device. The apparatus includes a memory and a controller coupled to store and recall digital audio files with the memory. A transceiver operates to transmit and receive digital audio files according to a radio protocol. An audio circuit receives audio files from the controller and outputs the audio files for analog audio reproduction. The controller responds to the receipt of an in-range radio signal by the transceiver, from the remote device, to exchange digital audio files with the remote device via the radio protocol. A memory card slot is adapted to accept plural user-replaceable memory cards. The apparatus compresses and decompresses the digital audio files, which may be according to the MP3 format. A microphone circuit provided to enable the recording and storing of voice messages.

31 Claims, 7 Drawing Sheets

DIGITAL AUDIO FILE REPRODUCTION SYSTEM AND METHOD WITH WIRELESS TRANSFER CAPABILITY

BACKGROUND OF THE INVENTION

1. Field of the Invention

The present invention relates to digital audio file utilization. More specifically, the present invention relates to the creation, storing, transferring by radio, and reproduction of digital audio files.

2. Description of the Related Art

Digitized audio is now the norm for a variety of audio recording, distribution and playback applications. The compact disc has supplanted magnetic tapes and vinyl phonograph albums, and more recently, compressed digitized audio is becoming the standard for computer-based management of audio recordings. In a compact disc recording, stereo analog audio signals are sampled at a high rate of about 44 kilosamples per second and then stored as digital audio files on a compact disc medium for later playback. Because of the large amount of data needed to store typical audio recordings, techniques for compressing the digitized audio files have been developed. One prominent standard for compressed digital audio files is the MP3 standard. The MP3 standard was developed by the Motion Picture Experts Group (hereinafter "MPEG") as the audio layer 3 protocol used in a variety of digital image, motion picture and audio applications. Other digitized audio file compression techniques are known. The Microsoft Windows® operating system uses a proprietary '.WAV' digital audio file format. Other formats are known as well. Digital audio has not completely replaced analog audio. For example, analog AM and FM radio audio coexists with digital broadcast radio services. Broadcast television similarly includes analog FM audio and compressed digital audio is used in high definition television ("HDTV"). Telephony services still employ analog audio, especially near the end user point of termination within telephone networks.

The digitization and compression of audio files has lead users from an environment where collections of audio tracks were stored on fixed media, including records, tapes and CD's, to an environment where collections of audio tracks are stored in computer memories and storage media. Music and audio players now rely upon a computer to recall digital audio files from a memory, decompress them, convert them to analog and reproduce them for listening. The MP3 player is an example of this technology. Users commonly convert CD audio files to MP3 format, store them on their computers, and download portions of the digital audio files to their MP3 players for later listening. The Internet plays a pivotal roll in the management of digitized audio files as well. User can now download digital audio files over the Internet and store them on their personal computer. Once in their personal computers, users can replay the audio files on the computer or download them to a portable player for later reproduction and listening.

Advancement in digital audio technology has lead to an increase in the number and kinds of applications where digital audio is used. Of course, the distribution of popular music by the entertainment industry is a major application of digital audio files. Today users are able to create their own digital files though the use of their personal computers. Computer software applications are capable of synthesizing digital audio files. Personal audio recorders are available for voice to digital voice recording. Digital audio files related to news, stocks, music and voice are available for downloading over the Internet. Portability is another advantage in digital audio file applications. Since the no physical media like discs and tapes are used, digital audio plays are virtually immune to shock and vibration. This allows users to take advantage of portable and mobile, or vehicular, digital audio players to unprecedented levels. Digital audio can be used during recreational and sporting activities, while travelling, in the home, at the office, and in the automobile.

Given that users enjoy a wide variety of applications for digital audio files, and given that users have access to a variety of sources and playback devices for digital audio files, there exists a challenge in integrating these capabilities. A user may have a collection of audio files on their personal computer. From time to time, that user might want some of the files available for use on a portable device. Another time they may desire to have access to some of the audio files in the automobile. In fact, there may be times a user wants to gather or create audio files while mobile. Heretofore, users have had to employ physical interconnection of their digital audio equipment to transfer files. Users have had to manually decide what files to transfer and then wait while such transfers were accomplished. Certain network solutions to these challenges have existed, but they require a high degree of technical sophistication to employ. Thus, there is a need in the art for a system and method of integrating and automating the use, creation, distribution, and listening of digital audio files among fixed, portable and vehicular applications.

SUMMARY OF THE INVENTION

The need in the art is addressed by the apparatus, systems and methods of the present invention. A digital audio file reproduction apparatus having wireless transfer capability with a remote device is taught. The apparatus includes a memory and a controller coupled to store and recall digital audio files with the memory. A transceiver, that is coupled to the controller, operates to transmit and receive digital audio files according to a radio protocol. An audio circuit receives audio files from the controller and outputs the audio files for analog audio reproduction. The controller responds to the receipt of an in-range radio signal by the transceiver, from the remote device, to exchange digital audio files with the remote device via the radio protocol.

In a specific embodiment of the invention, the memory further includes a memory card slot that is coupled to the controller. The slot is adapted to accept a user-replaceable memory card. In a refinement to this embodiment, the memory card slot is adapted to accept plural user-replaceable memory cards. In another specific embodiment, the controller operates to compress and decompress the digital audio files. The digital audio files may be compressed and decompressed according to the MP3 format. The controller may include a digital signal processor to facilitate the compression and decompression of the digital audio files.

In another specific embodiment of the present invention, the apparatus further includes a microphone circuit that is coupled to the controller. The controller operates to receive microphone audio signals from the microphone circuit, digitize, and store the microphone audio signals as digital audio files in the memory. In a refinement to the invention, the air protocol is selected from one of a wireless LAN standard protocol, the Bluetooth protocol, a proprietary cordless telephone data protocol, or the 2.4 GHz cordless protocol. In another refinement, the controller controls the transceiver to periodically transmit a link request radio signal for receipt by the remote device. The controller may also operate to control the transceiver to transmit an in-range radio signal in response to receipt of a link request radio signal from the remote unit. The in-range radio signal may include a list of digital audio files stored in the memory. Similarly, the controller may operate to control the transceiver to transmit a list of digital audio files stored in the memory in response to receipt of the in-range radio signal. In this way, the apparatus and the remote unit exchange lists of files in their respective memories.

In another specific embodiment, the apparatus further includes a user input actuator. The controller operates to cause the transceiver to transmit and receive digital audio files with the remote device in response to actuation of the user input actuator. In a refinement to the present invention, the controller is a personal computer with an interface bus, and the transceiver is disposed upon an interface card coupled to the interface bus. The audio output circuit may be a personal computer sound card. In another refinement, the apparatus includes a display coupled to the controller, and the controller operates to display a list of files names associated with the digital audio files stored in the memory. In another refinement of the present invention, the digital audio file reproduction device is adapted for vehicular use, and the audio output circuit couples analog audio files to an existing vehicular audio system.

A particular embodiment of the present invention teaches a digital audio file reproduction systems with wireless transfer capability. The system includes a first device and a second device, which communicate using a radio protocol. The first device includes a personal computing device that has a storage unit, a keyboard, a display, and a peripheral interface. A sound circuit is coupled to the personal computing device, and has a first microphone and a loudspeaker. A first transceiver unit is coupled to the peripheral interface, and it operates to transmit and receive digital audio files according to the radio protocol. The personal computing device operates to compress and decompress the digital audio files. It also controls the first transceiver to periodically transmit a link request radio signal for receipt by the second device. Also, the personal computing device operates to control the first transceiver to transmit a list of digital audio files that are stored in the storage unit in response to receipt of the in-range radio signal. The personal computing device also operates to cause the first transceiver to transmit and receive digital audio files with the second device in response to actuation of the keyboard. It can also cause the display of a list of files names associated with the digital audio files stored in the storage unit. The second device operates in radio communications with the first device.

The second device includes a memory that has a card slot adapted to accept plural user replaceable memory cards, and a controller that operates to compress and decompress the digital audio files as they are stored and recalled in the memory. A second transceiver, coupled to the controller, operates to transmit and receive digital audio files according to the radio protocol. A microphone circuit is coupled to the controller, and the controller operates to receive microphone audio signals from the microphone circuit, digitize, compress and store them as digital audio files in the memory. An audio circuit is coupled to receive audio files from the controller, and output them for coupling analog audio files to an existing vehicular sound system. The controller controls the second transceiver to transmit an in-range radio signal in response to receipt of a link request radio signal from the first device. The controller is also responsive to the receipt of an in-range radio signal by the second transceiver, from the first device, to exchange digital audio files with the first device via the radio protocol.

The present invention also teaches a method of transferring digital audio files between a first memory in a first device and a second memory in a second device using wireless transmission means. The method includes the steps of periodically transmitting a link request radio signal by the first device, and transmitting a responsive radio signal by the second device, in response to receiving one of the link request radio signals. Further, recalling a first digital audio file from the memory of the first device and transmitting the first digital audio file to the second device, and storing the first digital audio file in the memory of the second device. Also, recalling a second digital audio file from the memory of the second device and transmitting the second digital audio file to the first device, and storing the second digital audio file in the memory of the first device.

In a specific embodiment of the foregoing method, it further includes the steps of recalling the first digital audio file from the memory of the second device, and reproducing the audio file by analog means. In another refinement, the transmitting steps are accomplished according to a particular radio protocol. In another embodiment, the second memory includes a card slot adapted to receive a memory card, and the method includes the further step of inserting a memory card into the memory card slot. In a refinement to the method, the steps of compressing the first digital audio file by the first device and storing the first audio file in the memory of the first device are added.

In another specific embodiment of the method, further steps are added. These include recalling the first digital audio file from the memory of the second device, decompressing the first audio file by the second device, and reproducing the audio file by analog means. The digital audio files may be compressed and decompressed according to the MP3 format. In another refinement, the second device includes a microphone circuit, and the further steps of receiving microphone audio signals from the microphone circuit, digitizing the microphone audio signals, and storing the microphone audio signals as digital audio files in the second memory are added.

In another specific embodiment, the wireless transmission means operates in accordance with a wireless LAN standard protocol, the Bluetooth protocol, a proprietary cordless telephone data protocol, or the 2.4 GHz cordless protocol. In another refinement, the responsive radio signal includes an in-range radio signal. The in-range radio signal may include a list of digital audio files stored in the second memory. The method may include the further steps of transmitting, by the first device, a list of digital audio files stored in the first memory in response to receipt of the in-range radio from the second device. In another embodiment, the first device includes a user input actuator. The method then includes the further steps of exchanging digital audio files between the first memory of the first device and the second memory of the second device by wireless transmission means in response to actuation of the user input actuator. The first device may include a display, and the further step of displaying a list of file names associated with the digital audio files stored in the first memory.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
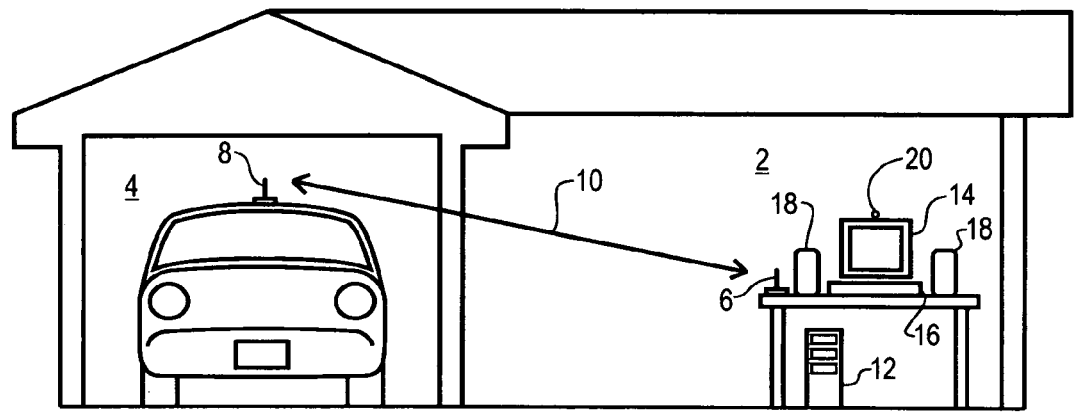
FIG. 1 is a diagram of a vehicular application according to an illustrative embodiment of the present invention.

Reference is directed to FIG. 1, which is a diagram of a vehicular application according to an illustrative embodiment of the present invention. In this illustration, an automobile 4 is parked in the garage of a home 2. A personal computer 12 in the home 2 includes the software and hardware of the illustrative embodiment. The hardware (not shown) includes a radio transceiver board disposed on the interface bus of the computer 12. Software runs on the computer to effect the functionality of the illustrative embodiment. An antenna 6 is coupled to the transceiver board (not shown). The computer 12 is further coupled to a keyboard 16, a video monitor 14, a pair of stereo loud speakers 18 and a microphone 20. The microphone 20 and loud speakers 18 are coupled to a sound card (not shown), which is also located in the computer 12 bus interface. The computer 12 may be any of the personal computers that are known to those skilled in the art, and may run any of the operating systems known to those skilled in the art. The keyboard 16, monitor 14, speakers 18, and microphone 20 are also of the variety known to those skilled in the art to be useful when used in conjunction with the aforementioned personal computers.

The automobile 4 has an antenna 8 disposed on or in it. The antenna 8 is coupled to an apparatus of the illustrative embodiment (not shown) locate inside the automobile, which is more fully described elsewhere herein. One, or both, of the antennas 6,8 periodically radiate a signal in an operation that seeks the other device. The power of the transmitting circuits is limited such that the communications range between the vehicular antenna 8 and the computer's 12 antenna 6 is limited to a distance commensurate with the distance between the antennas when the vehicle 4 is located in the vicinity of the home 2. Thus, when the vehicle moves into range, the communications link 10 is established for bi-directional radio communications. A radio protocol is employed that enables the two devices to inquire as to the type and quantity of digital audio files stored in each. They are operable to compare lists and to update the files stored in both as needed, or as otherwise directed by a user of the system. File transfer is accomplished using the radio protocol to send digital data packets, which comprise the digital audio files that are to be transferred. Detection of the in-range condition is automatic, as is the commencement of file transfers. Since users typically leave the vehicle parked in the vicinity of their home for extended periods of time, such as overnight, the radio data throughput rate is not critical.

From time to time the user can access the personal computer 12 to create, gather, input, delete, organize, or alter digital audio files. For example, audio files may be input using a CD drive in the computer 12 which can then compress and store commercial music CDs. The user can also download files through the Internet. The user can create an audio file using a synthesizer application on the computer 12. Or, the user can simply record spoken statements through the microphone 20. Each of the files includes a file type designator, in addition to a name tag and other information. For example, the file type designation may include "Music", "News", "Voice" and others. The computer can reproduce the audio files 12 with the sound card (not shown) through the speakers 18. As the number and kinds of audio files in the computer memory changes, the illustrative embodiment software tracks a list of the audio files under its purview. When the vehicle moves into radio range 10 of the computer antenna 6, then the audio files lists of the vehicle side and computer side are exchanged and examined for differences. The user can particularly tag some files for transfer, update, or deletion. Differences in the file list and user tags define which audio files are to be transferred between the two locations. In addition to automatic transfer, the user can initiate a transfer manually through the computer keyboard.

Figure 2:
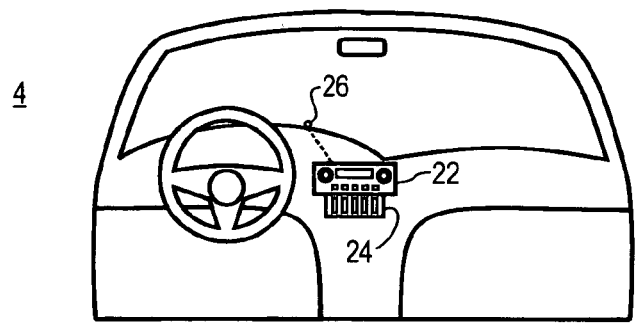
FIG. 2 is a diagram of a vehicular interior according to an illustrative embodiment of the present invention.

Reference is directed to FIG. 2, which is a diagram of a vehicular 4 interior according to an illustrative embodiment of the present invention. In the illustrative embodiment, the existing vehicle stereo system 22 is used to amplify and reproduce audio files that are output from the illustrative embodiment transceiver and controller device 24. A microphone 26 is coupled to the transceiver and controller 24 to enable the user to record audio voice messages while in the vehicle 4. The antenna 8 on the exterior of the vehicle is also coupled to the transceiver and controller device 24.

Figure 3:
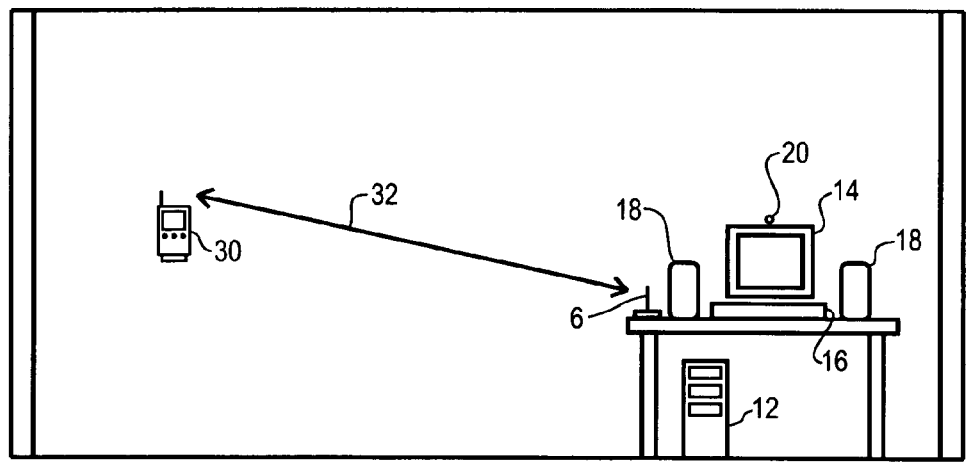
FIG. 3 is a diagram of a portable application according to an illustrative embodiment of the present invention.

Reference is directed to FIG. 3, which is a diagram of a portable device application according to an illustrative embodiment of the present invention. The illustrative embodiment in FIG. 3 is similar to that shown if FIG. 1, except that in FIG. 3, a hand portable device 30 is fitted with the transceiver, controller and software of the illustrative embodiment. The personal computer 12 is coupled to a keyboard 16, a video monitor 14, and to a pair of speakers 18 and microphone 20 through a sound card (not shown) in the computer interface bus. An antenna 6 is coupled to the transceiver and controller interface card (not shown), that is located in the computer 12 interface bus. The portable device 30 communicates 32 via a radio protocol through antenna 6 with the personal computer 12.

Figure 4:
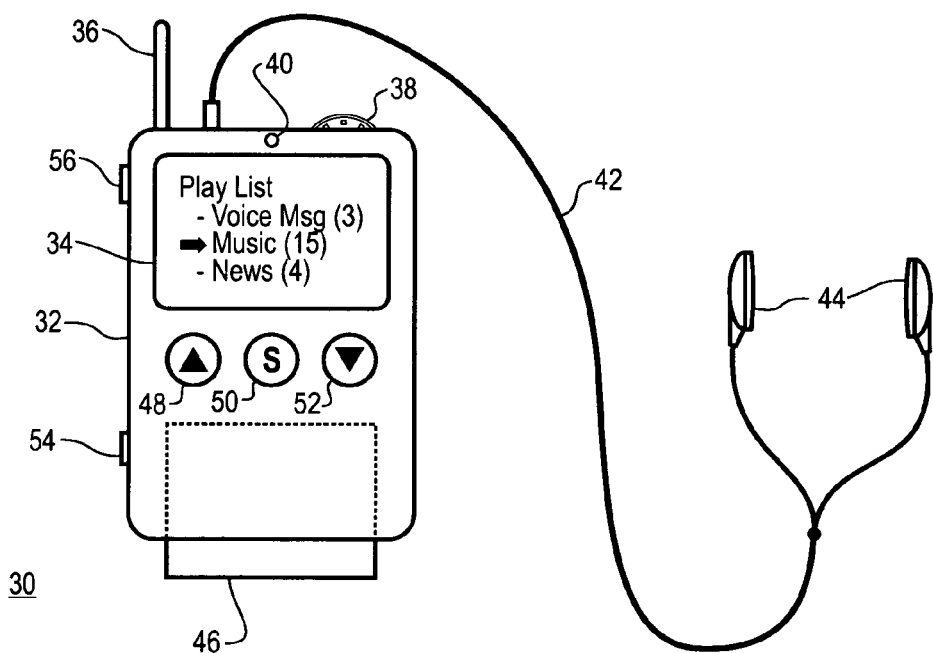
FIG. 4 is a drawing of a portable device according to an illustrative embodiment of the present invention.

Reference is directed to FIG. 4, which is a drawing of the portable device 30, discussed with respect to FIG. 3, according to an illustrative embodiment of the present invention. The portable device 30 in FIG. 4 is similar in certain respects to a modern MP3 player, as known to those skilled in the art. The portable device includes a housing 32 with a display 34 that embodies a portion of the user interface of the device 30. One function of the display 34 portion of the user interface is to enable the user to scroll through and select from the various digital audio files stored in the device 30. The display 34 content illustrated in FIG. 4 is exemplary, and shows that the user has a play list with three classes, "Voice" messages, "Music", and "News". There are three, fifteen and four files in each class, respectively. Access to the menu and selection process is accomplished with a scroll-up key actuator 48, a scroll-down key actuator 52, and a select key actuator 50. Those skilled in the art will appreciate that there are many kinds of user interface display and actuator arrangements that would apply equally well for use with the present invention.

A memory card 46 is inserted into a memory slot in the case 32 of the device 30. A Flash memory, as are known to those skilled in the art, is a suitable type of memory card 46. An antenna 36 is disposed on the exterior of the case 32 and is used to communicate the radio protocol to the computer or other compliant device. A microphone 40 is provided so the user can record voice notes to the memory as digital audio files. A pair of ear-bud style headphones 44 are provided so the user can listen to selected digital audio files. The headphones 44 are coupled to the device 30 via a cable 42. A volume control 38 is provided. A Universal Serial Bus ("USB") serial port 56 is provided so the device can receive digital audio files in the same fashion as prior art MP3 players receive audio files. A power supply connector 54 is provided to enable charging of internal batteries, or for powering the device 30 when used in a fixed location.

Figure 5:
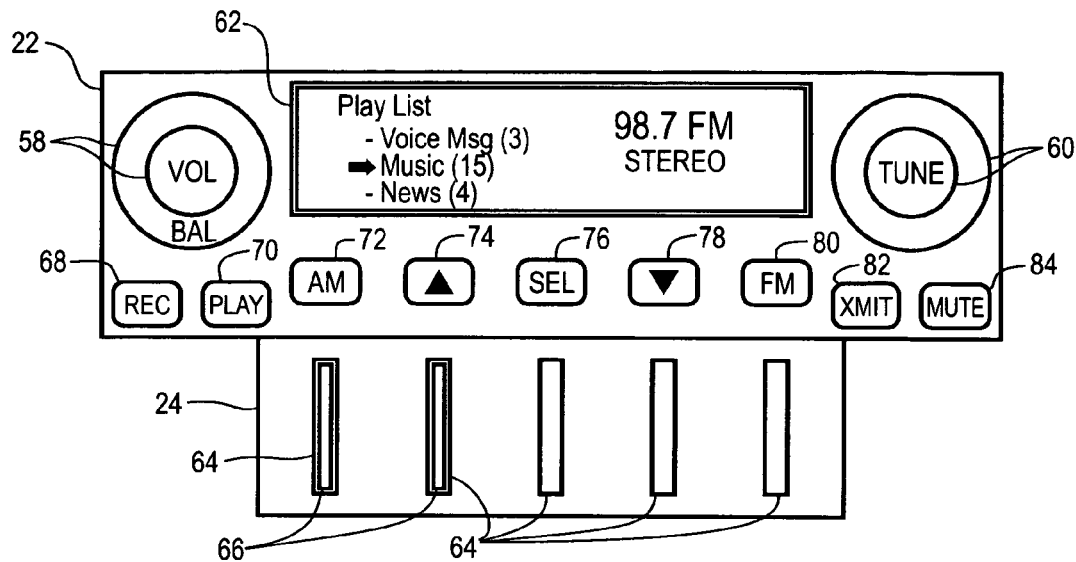
FIG. 5 is a drawing of a vehicular device according to an illustrative embodiment of the present invention.

Reference is directed to FIG. 5, which is a drawing of a vehicular device according to an illustrative embodiment of the present invention. The vehicular device includes a stereo radio and user interface portion 22 and a transceiver and controller portion 24. This structure is arbitrary and those skilled in the art will appreciate that the specific structure is a matter of style, as well as function. The stereo portion can be supplied with the device or can be adapted from the existing vehicular stereo system, in which case some of the user interface functions for the present invention functionality are incorporated into the transceiver and controller portion of the device. In the illustrative embodiment of FIG. 5, the transceiver and controller portion 24 includes plural Compact Flash ("CF") card slots 64. Each slot accepts one Compact Flash card 66. Those skilled in the art will appreciate that other memory card technologies could be utilized in the present invention. The user of the device 24 can insert as many CF cards 66 as is needed to store the desired quantity of digital audio files. The multiple slot 64 approach provides lower initial cost and expandability to users. It also provides a measure of portability, in that the CF cards can be inserted into other devices, making the digital audio files stored therein portable from device to device.

The stereo radio portion 22 of the device includes an AM/FM receiver with the classic tuning control 60, as well as volume and stereo balance controls 58. An AM radio selector 72 and an FM radio selector 80 are provided. The digital audio file selections are made using a scroll up key actuator 74, a scroll down key actuator 78 and a select key actuator 76. In addition, there is a record key actuator 68 that allows the user to record audio message though the microphone (not shown). A play key actuator 70 allows the user to enable playback of selected digital audio files. A mute key actuator 84 allows the user to silence the device when desired. A transmit key actuator 82 allows the user to force the transfer of digital audio files with the computer host device, or other compliant device. The entire system 22, 24 is installed into the dashboard of the user's vehicle. It draws power from the un-switched power supply in the vehicle, thereby allowing the systems 22, 24 to transfer files with the host or other compliant device when the vehicle is not in operation.

Figure 6:
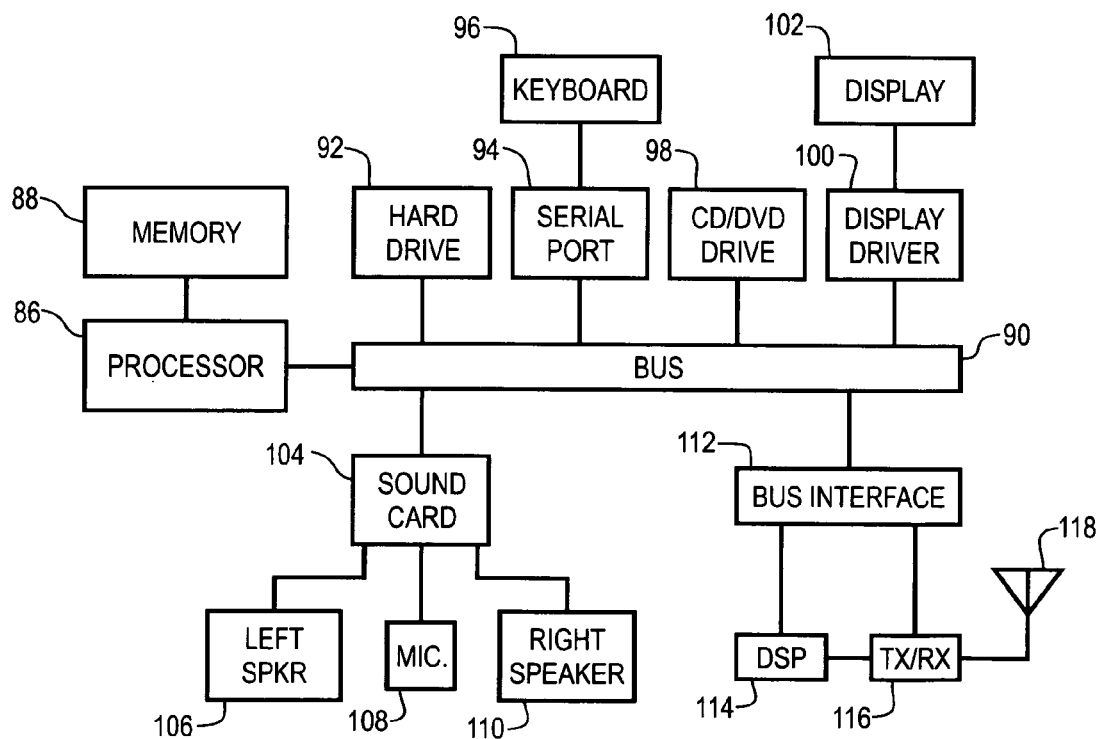
FIG. 6 is a functional block diagram of a personal computer application according to an illustrative embodiment of the present invention.

Reference is directed to FIG. 6, which is a functional block diagram of a personal computer application according to an illustrative embodiment of the present invention. The diagram in FIG. 6 is consistent with the computer applications illustrated in FIG. 1 and FIG. 3. In FIG. 6, an IBM compatible personal computer device is used to host for the illustrative embodiment, although those skilled in the art will realize that other computer devices are equally applicable. The system includes a computer processor 86, such as an Intel Pentium processor, coupled to one or more computer busses 90. The processor accesses RAM memory 88. The busses 90 are coupled to several computer peripheral components including a hard disc drive 92, a serial port 94 and keyboard 96, a CD/DVD read/write drive, and a display driver 100 card and video display 102. Such computer configurations are well known to those skilled in the art. In addition, for full implementation of the present invention, it is desirable to include a sound card 104 with left and right stereo speakers 106, 110, and microphone 108. Sound cards are known to those skilled in the art. The controller and transceiver card of the illustrative embodiment is comprised of a bus interface 112 to enable bi-directional communications with the computer bus 90. Also included is a radio transceiver 116, which is compliant with the radio protocol used in the illustrative embodiment. A digital signal processor 114 is employed to enable high-speed compression and decompression of MP3 audio files. In the alternative, the main processor 86 of the computer can be used to compress and decompress MP3 files. Software (not shown), which embodies the illustrative embodiment is loaded into the hard drive 92 of the computer and is executed by the processor 86. In operation, the software enables operation of the transceiver and controller portions of the illustrative embodiment through a device driver for the bus interface 112. An antenna 118 is coupled to the transceiver for receiving and transmitting data packets comprised of the digital audio files.

Figure 7:
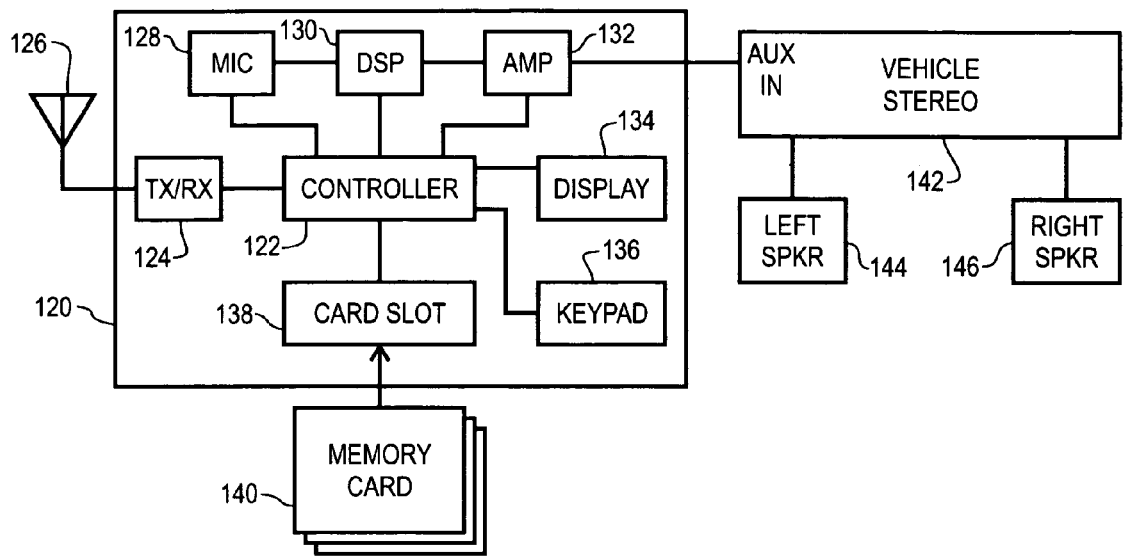
FIG. 7 is a functional block diagram of a vehicular device according to an illustrative embodiment of the present invention.

Reference is directed to FIG. 7, which is a functional block diagram of a vehicular device according to an illustrative embodiment of the present invention. The illustrative embodiment in FIG. 7 incorporates a transceiver and controller unit 120 that interface to an existing vehicle stereo radio 142, thereby allowing the system to reproduce digital audio files as analog signals through the vehicle's left and right stereo loudspeakers 144, 146. Audio signals are coupled to an existing auxiliary analog input in the vehicle stereo 142. The transceiver and controller unit 120 functions under the control of a controller 122, which can be any controller, microcontroller, processor, microprocessor, digital signal processor or other device known to those skilled in the art to be suitable for dedicated control applications in a vehicular environment. The controller 122 further comprises memory (not shown) for storing object code software that embodies the functionality of the device, including implementation of the radio protocol and the user interface functions of the system. The radio protocol can be one of many known to those skilled in the art to be suitable for packet data transmissions. Wireless local area network ('LAN') protocols are suitable and so is the Bluetooth protocol. In an illustrative embodiment, a cordless telephone protocol is applied, which is advantageous because it can be implement at relatively low cost. The cordless protocol may be a proprietary protocol or the 2.4 GHz cordless protocol, known to those skilled in the art. The controller is coupled to a radio transceiver 124 and communicates data packets therebetween. The data packets comprise digital audio files as well as file names, tags and other parameters needed to implement the radio protocol. The transceiver is coupled to an antenna 126, which radiates and receives radio data packets to and from a compliant host or other portable or vehicular device.

In operation, the controller 122 receives data packets from the transceiver 124 and organizes them into digital audio files. The organized digital audio files are stored in removable memory cards 140 that are coupled to the controller through a card lot interface 138. The memory cards 140 in the illustrative embodiment are Flash memory cards, as are known to those skilled in the art. In the converse operation of transmitting digital audio files, the controller recalls digital audio files from the memory cards 140 and parses the file into data packets that are coupled to the transceiver 124 and transmitted to a compliant device. The controller 122 also produces the packet structure and signaling overhead required to implement the radio protocol and the signaling handshaking that is required for the automatic operation features of the present invention. In particular, the controller 122 generates a link request signal that is transmitted periodically in a effort to seek a remote compliant device. At the same time, the controller 122 receives packets from the transceiver 124 and decodes the packets for data content and radio protocol commands. If the controller 122 receives a link request packet, which is one of the protocol commands, from the transceiver, it produces an in-range packet and transmits it in response to receipt of the link request packet. The in-range packet may include a list of the digital audio files stored in the memory cards 140.

The transceiver and controller unit 120 further includes a user interface comprised of a keypad 136, a display 134, and a microphone 128. The keypad 136 and display 134 are coupled to the controller 122. User commands are entered through several key actuators located in the keypad 136. Digital audio file names and function selection indicators are displayed on the display 134. The implementation of keypads and displays, suitable for vehicular applications, are well known to those skilled in the art. In the illustrative embodiment, the digital audio files are compressed to the MP3 format. Audio signals input to the microphone 128 are coupled to a digital signal processor ('DSP') 130 that samples and digitizes the signals, and then compresses them according to the MP3 format standards. The compressed MP3 files are coupled to the controller 122 for storage in the memory cards 140. In the playback mode of operation, the controller 122 recalls MP3 format digital audio files from the memory cards 140 and couples them to the DSP 130. The DSP decompresses the MP3 files and performs a digital-to-analog conversion. The analog audio is then coupled to an amplifier 132, which outputs the amplified signals to the vehicle stereo 142 for reproduction.

Figure 8:
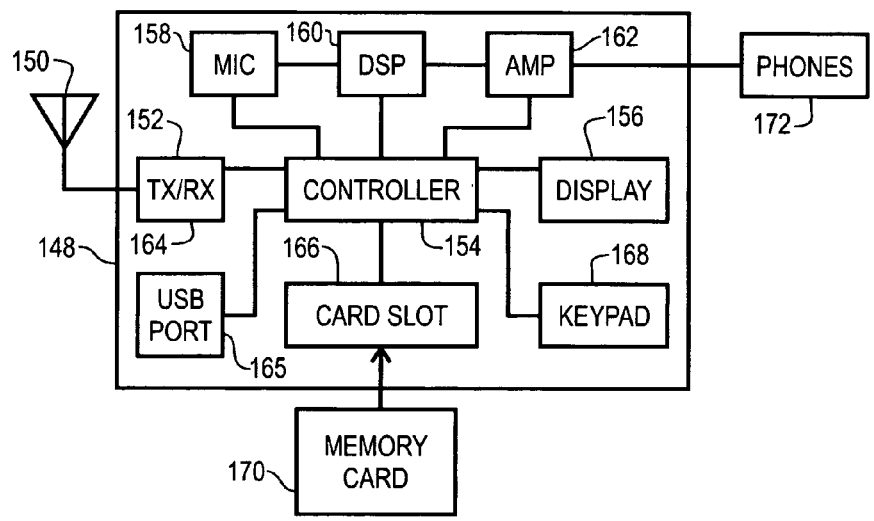
FIG. 8 is a functional block diagram of a portable device according to an illustrative embodiment of the present invention.

Reference is directed to FIG. 8 is a functional block diagram of a portable device 148 according to an illustrative embodiment of the present invention. The components and functions of the portable device depicted in FIG. 8 are directly analogous to those of the vehicular device depicted in FIG. 7. Thus, in FIG. 8, the controller 154, transceiver 164, display 156, keypad 168, microphone 158, DSP 160, card slot 166, and memory card 170 comply with the descriptions given for the device in FIG. 7, and will not be repeated here. There are a few differences in the portable device 148 in FIG. 8. The antenna 150 in is adapted to extend from the enclosure (not shown) of the portable device 148. The amplifier 162 is adapted to drive a pair of headphones 172. The card slot in the illustrative embodiment is adapted to receive a single memory card 170. A USB port 165 is provided so that a direct connection transfer of MP3 files from a host computing device is possible, when desired by the end user. The display 156 and keypad 168 are also adapted from the style and functions of the portable device.

Figure 9:
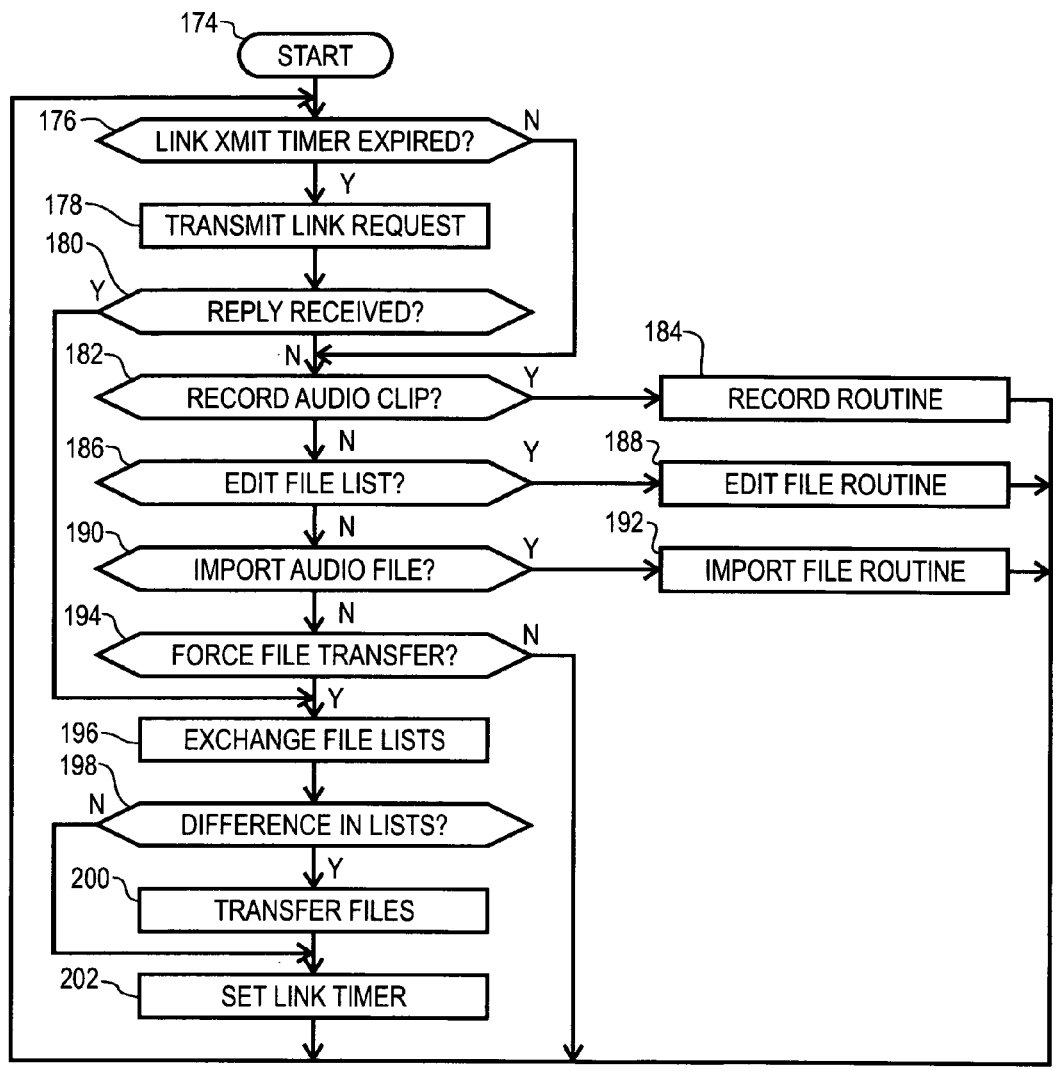
FIG. 9 is a process flow diagram of a personal computer application according to an illustrative embodiment of the present invention.

Reference is directed to FIG. 9, which is a process flow diagram of a personal computer application according to an illustrative embodiment of the present invention. The process depicted in FIG. 9 is executed on the personal computer that hosts the present invention transceiver card in this illustrative embodiment. It is embodied in executable software that is loaded into the personal computer's memory at run time. The process begins at step 174 and proceeds to step 176 where a test is made to determine if the link request transmit timer has expired. The link request timer sets the interval between transmitted link request. If the timer has expired, flow proceeds to step 178 where a link request is transmitted. If the timer has not expired at step 176, then it is not yet time to transmit another link request and flow proceeds to step 182, which is described below. After the link request is transmitted at step 178, a test is made at step 180 to determine if a reply to the transmitted link request has been received. If a reply is received, then flow proceeds to step 196, which is described below. On the other hand, at step 180, if no reply has been received, then flow proceeds to step 182 where a series of user interface activities are evaluated.

At step 182 in FIG. 9, a test is made to determine if the user has initiated the audio clip record function. This is the function where the microphone audio is digitized and stored an audio file. If the user has entered this command, then flow proceeds to step 184, where a record audio clip routine is executed. After completing this routine, flow returns to step 176. On the other hand, at step 182, if the user has not initiated the record audio clip function, flow proceeds to step 186. Step 186 is a test to determine if the user has initiated an edit file function. If the user has, then flow proceeds to step 188 where an edit file routine is executed. This routine handles the organization and deletion of audio files to and from the user's play list. After step 188, flow returns to step 176. On the other hand, at step 186, if the user has not initiated an edit file command, then flow proceeds to step 190. Step 190 is a test to determine if the user has initiated and import file command. If the user has, then flow proceeds to step 192, where an import file routine is executed. Import file routine allows the user to gather digital audio files from various resources, including fixed media, the internet and other connected devices. Upon completion, flow proceeds to step 176. On the other hand, at step 190, if the user has not initiated the import routine, flow proceeds to step 194.

Step 194 in FIG. 9 is a test to determine of the user has initiated a forced transfer of audio files with a remote device. If not, flow returns to step 176 to retest the link request timer. If the user has initiated a forced file transfer at step 194, or if a reply has been received from a link request message, flow proceeds to step 196 where the file transfer process begins. The first step in a file transfer is to exchange file lists with the remote device, which occurs at step 196. If there are no differences in the file lists, then no file exchange is needed, and, step 198 routes flow to step 202, where the link request timer is reset. If there is a difference in file lists at step 198, then the differences files are transferred, under the radio protocol, at step 200. One the file transfers are complete, flow proceeds to step 202 where the link timer is reset and flow returns to step 176 to begin anew.

Figure 10:
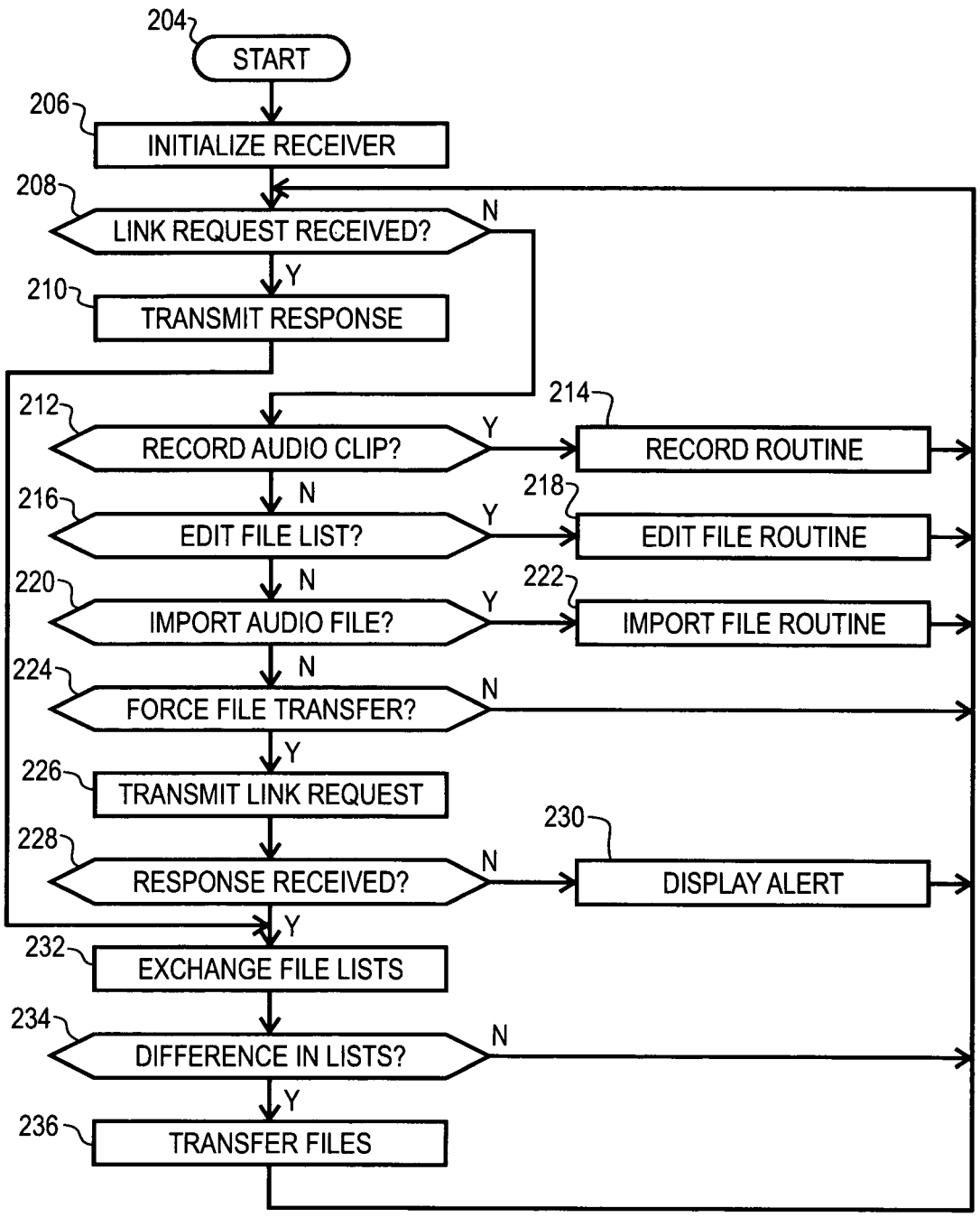
FIG. 10 is a process flow diagram of a portable or vehicular application according to an illustrative embodiment of the present invention.

Reference is directed to FIG. 10, which is a process flow diagram of a portable of vehicular application according to an illustrative embodiment of the present invention. The illustrative embodiment depicted in FIG. 10 employs a portable or vehicular unit that monitors for a link request signal from a host unit by waiting to receive a link request data packet. In other embodiments, both the portable or vehicular units may actively seek a host unit by periodically transmitting their own link request signals. The illustrative embodiment depicted in FIG. 10 is advantageous because it minimizes power consumption in the battery-powered device by eliminating the periodic transmission process. The process begins at step 204 and proceeds to step 206 where the receiver of the device is initialized. At step 208, a test is made to determine if a link request signal has been received. The reception of a link request signal indicates that the portable unit is in range with a host unit. If a link request signal is received, then the device transmits a responsive signal at step 210.

The responsive signal may be a in-range signal. Flow then proceeds to step 232, where the file exchange process commences, which is described below. On the other hand, at step 208, if a link request signal has not been received, then flow proceeds to step 212, which is a series of user interface operations.

Step 212 in FIG. 10 begins the user interface handling routines in the portable or vehicular device. At step 212, a test is made to determine if the user has initiated the audio clip record function. This is the function where the microphone audio is digitized and stored an audio file. If the user has entered this command, then flow proceeds to step 214, where a record audio clip routine is executed. After completing this routine, flow returns to step 208. On the other hand, at step 212, if the user has not initiated the record audio clip function, flow proceeds to step 216. Step 216 is a test to determine if the user has initiated an edit file function. If the user has, then flow proceeds to step 218 where an edit file routine is executed. This routine handles the organization and deletion of audio files to and from the user's play list. After step 218, flow returns to step 208. On the other hand, at step 216, if the user has not initiate an edit file command, then flow proceeds to step 220. Step 220 is a test to determine if the user has initiated and import file command. If the user has, then flow proceeds to step 222, where an import file routine is executed. Import file routine allows the user to gather digital audio files from various resources. Upon completion, flow proceeds to step 208. On the other hand, at step 220, if the user has not initiated the import routine, flow proceeds to step 224.

Step 224 in FIG. 10 is a test to determine if the user has requested a forced transfer of audio files with a host device. If no such request has been made, flow returns to step 208. If a forced transfer request has been made, then flow proceeds to step 226, where a link request message is transmitted. At step 228, a test is made to determine if a response to the link request has been received. It is possible that the portable device is out of radio range with the desired host device. Therefore, if no response is received at step 228, an alert is displayed to the user indicating the out of range condition at step 230. Flow then proceeds to step 208. On the other hand, at step 228, if a response has been received, then flow proceeds to step 232. At step 232, the portable device and the contacted host exchange file list according to the radio protocol. If there are no differences in the file lists, then no file exchange is needed, so step 234 routes flow to step 208 to begin anew. If there is a difference in file lists at step 234, then the difference files are transferred, under the radio protocol, at step 236. One the file transfers are complete, flow returns to step 208 to begin anew.

Figure 11:
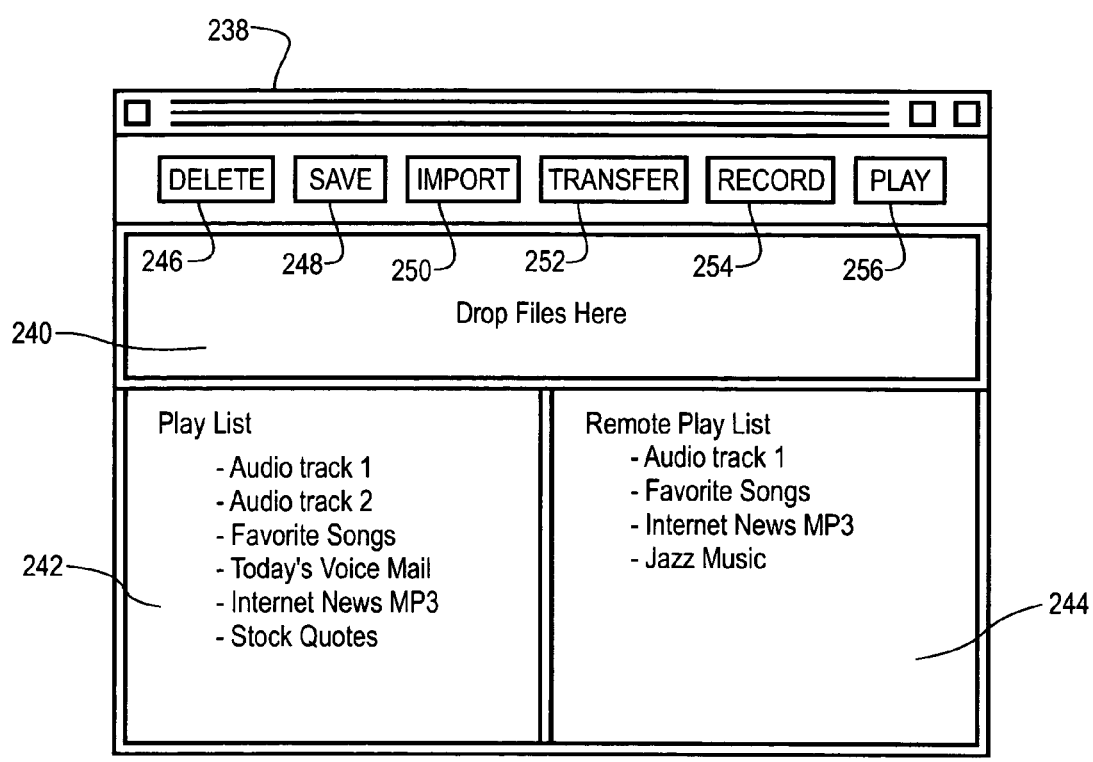
FIG. 11 is a drawing of a display screen according to an illustrative embodiment of the present invention.

Reference is directed to FIG. 11, which is a drawing of a display screen according to an illustrative embodiment of the present invention. The display screen 238 is suitable for use in the personal computer video display in the illustrative embodiment. A play list is presented in a first portion 242 of the display 238. The play list lists all of the digital audio files stored in the computer, which are accessible to the illustrative embodiment. A second portion 244 of the display 238 presents a play list for the remote device, which may be a portable or vehicular device. A drag and drop portion 240 is present in the display area to allow the user to place digital audio files in the illustrative embodiment application from other applications present in the personal computer by using operating system features for the drag and drop process. A series of on-screen buttons are presented to enable user activated functions. These include a Delete button 246 for deleting a selected audio file. There is a Save button 248 for saving a current configuration to the computer hard disk. There is an Import button 250 for importing audio files from a remote device or from a network connection. There is a Transfer button 252 for forcing a transfer of files between the computer and a remote device. There is a Record button 254 for activating the microphone recording function. And, there is a Play button 256 for causing a selected audio file to be reproduced by the computer sound card and speakers. Those skilled in the art will appreciate that a large variety of display formats can be envisioned for accomplishing the user interface and function activations made possible through access to the teaching of the present invention.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A digital audio file reproduction apparatus having wireless transfer capability with a remote digital audio file reproduction device that responds to receipt of a link request radio signal by transmitting an in range radio signal, comprising:
   a memory;
   a controller coupled to store and recall digital audio files with said memory;
   a transceiver, coupled to said controller, operable to transmit and receive digital audio files according to a radio protocol;
   an audio circuit coupled to receive digital audio files from said controller, and output corresponding analog audio signals for analog audio reproduction, and wherein
   said controller is coupled to cause said transceiver to periodically transmit a link request signal;
   said controller is responsive to the receipt of an in-range radio signal by said transceiver, from the remote digital audio file reproduction device, which responds to said link request signal, to automatically establish a communication link with the remote digital audio file reproduction device and execute a bidirectional exchange of digital audio files with the remote digital audio file reproduction device via said radio protocol.

2. The apparatus of claim 1 wherein said memory further comprises a memory card slot coupled to said controller and adapted to accept a user-replaceable memory card.

3. The apparatus of claim 2 wherein said memory card slot is adapted to accept plural user-replaceable memory cards.

4. The apparatus of claim 1 wherein said controller is operable to compress and decompress the digital audio files.

5. The apparatus of claim 4 wherein the digital audio files are compressed and decompressed according to the MP3 format.

6. The apparatus of claim 4 wherein said controller comprises a digital signal processor operable to compress and decompress the digital audio files.

7. The apparatus of claim 1 further comprising:
a microphone circuit coupled to said controller, and wherein
said controller is operable to receive microphone audio signals from said microphone circuit, and operable to digitize and store said microphone audio signals as digital audio files in said memory.

8. The apparatus of claim 1 wherein said air protocol is selected from one of a wireless LAN standard protocol, the Bluetooth protocol, a proprietary cordless telephone data protocol, and the 2.4 GHz cordless protocol.

9. The apparatus of claim 1 wherein said controller controls said transceiver to periodically transmit a link request radio signal for receipt by the remote digital audio file reproduction device.

10. The apparatus of claim 1 wherein said controller is operable to control said transceiver to transmit an in-range radio signal in response to receipt of a link request radio signal from the remote digital audio file reproduction device.

11. The apparatus of claim 10 wherein said in-range radio signal comprises a list of digital audio files stored in said memory.

12. The apparatus of claim 1 wherein said controller is operable to control said transceiver to transmit a list of digital audio files stored in said memory in response to receipt of said in range radio signal.

13. The apparatus of claim 1 further comprising a user input actuator, and wherein said controller is operable to cause said transceiver to transmit and receive digital audio files with the remote digital audio file reproduction device in response to actuation of said user input actuator.

14. The apparatus of claim 1 wherein said controller is a personal computer and an interface bus and said transceiver is disposed upon an interface card coupled to said interface bus.

15. The apparatus of claim 14 wherein said audio output circuit is a personal computer sound card.

16. The apparatus of claim 1 further comprising:
a display coupled to said controller, and wherein
said controller is operable to display a list of files names associated with the digital audio files stored in said memory.

17. The apparatus of claim 1 wherein the digital audio file reproduction apparatus is adapted for vehicular use and said audio output circuit couples said analog audio signals to an existing vehicular audio system.

18. A method of transferring digital audio files between a first memory in a first digital audio file reproduction device and a second memory in a second digital audio file reproduction device using wireless transmission means, comprising the steps of:
periodically transmitting a link request radio signal by the first digital audio file reproduction device;
transmitting a responsive in range radio signal by the second digital audio file reproduction device, in response to receiving one of said link request radio signals, thereby establishing a communication link between the first digital audio file reproduction device and the second digital audio file reproduction device, and subsequently;
automatically recalling a first digital audio file from the memory of the first digital audio file reproduction device and transmitting said first digital audio file by wireless transmission means to the second digital audio file reproduction device and storing said first digital audio file in the memory of the second digital audio file reproduction device
recalling a second digital audio file from the memory of the second digital audio file reproduction device and transmitting said second digital audio file to the first digital audio file reproduction device and storing said second digital audio file in the memory of the first digital audio file reproduction device, and
recalling said first digital audio file from the memory of said second digital audio file reproduction device and reproducing said first digital audio file by analog means.

19. The method of claim 18 further comprising the steps of:
recalling said first digital audio file from the memory of the second digital audio file reproduction device, and
reproducing the audio file by analog means.

20. The method of claim 18 wherein said transmitting steps are accomplished according to a radio protocol.

21. The method of claim 18 wherein the second memory includes a card slot adapted to receive a memory card, and further comprising the stop of:
inserting a memory card into the memory card slot.

22. The method of claim 18 further comprising the steps of:
compressing said first digital audio file by the first digital audio file reproduction device, and
storing said first audio file in the memory of the first digital audio file reproduction device.

23. The method of claim 22 further comprising the steps of:
recalling said first digital audio file from the memory of the second digital audio file reproduction device;
decompressing said first audio file by the second digital audio file reproduction device, and
reproducing the audio file by analog means.

24. The method of claim 23 wherein the digital audio files are compressed and decompressed according to the MP3 format.

25. The method of claim 18 wherein the second digital audio file reproduction device includes a microphone circuit, and further comprising the steps of:
receiving microphone audio signals from the microphone circuit, and
digitizing said microphone audio signals, and
storing said microphone audio signals as digital audio files in the second memory.

26. The method of claim 18 wherein the wireless transmission means operates in accordance with one of a wireless LAN standard protocol, the Bluetooth protocol, a proprietary cordless telephone data protocol, aid the 2.4 GHz cordless protocol.

27. The matched of claim 18 wherein said responsive radio signal includes an in-range radio signal.

28. The method of claim 27 wherein said in-range radio signal includes a list of digital audio files stored in the second memory.

29. The method of claim 27 and further comprising the step of:
transmitting, by the first digital audio file reproduction device, a list of digital audio files stored in the first memory in response to receipt of said in-range radio from the second digital audio file reproduction device.

30. The method of claim 18 wherein the first digital audio file reproduction device includes a user input actuator, and further comprising the steps of:
exchanging digital audio files between the first memory of the first digital audio file reproduction device and the second memory of the second digital audio file reproduction device by wireless transmission means in response to actuation of the user input actuator.

31. The method of claim 18 wherein the first digital audio file reproduction device includes a display, and further comprising the step of:

displaying a list of files names associated with the digital audio files stored in the first memory.

\* \* \* \* \*